April 13, 1937.  C. A. BIRCH-FIELD  2,077,030
TELEVISION APPARATUS
Filed Sept. 11, 1929   2 Sheets-Sheet 1

INVENTOR
Charles A. Birch-Field
BY
ATTORNEY

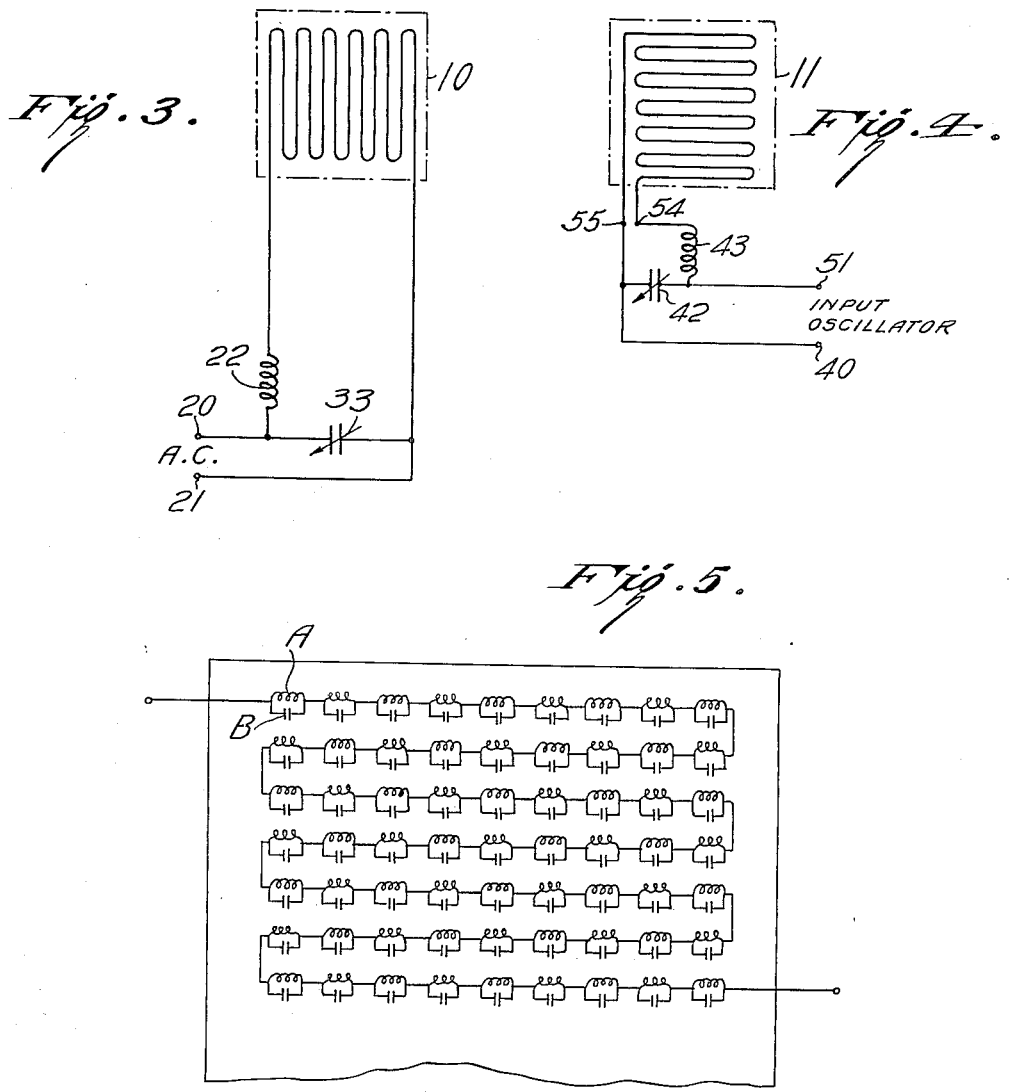

Patented Apr. 13, 1937

2,077,030

UNITED STATES PATENT OFFICE 2,077,030

TELEVISION APPARATUS

Charles A. Birch-Field, Larchmont, N. Y., assignor, by mesne assignments, to Mildred S. Reisman, New York, N. Y.

Application September 11, 1929, Serial No. 391,731

20 Claims. (Cl. 178—6)

My present invention relates generally to transmission of pictures, facsimiles and the like and more particularly to the employment therefor of electrical scanning.

Transmission of pictures at a distance, as hitherto attempted, employed mechanical scanning. This necessarily limits the speed of transmission to the speed at which the mechanical scanning can be performed and in addition, due to the fact that the scanning is done in sections and the speed limited by the physical construction of the moving parts, the effect hitherto produced has been that of a silhouette.

One of the objects of my invention is the employment of a process and the provision of an arrangement whereby the scanning operation is so speeded up that not only is the transmission of the pictures speeded up, but also the tendency to produce a silhouette effect will be totally eliminated and the picture transmitted be a more exact duplication of the original.

My invention is of particular importance in connection with the transmission of moving scenes in which the speed of the transmission by the employment of my process and arrangement is so great that as far as the perceptive ability of the human eye is concerned the reception will be an exact reproduction of the original constantly shifting scene.

Before proceeding to describe my invention, I will premise that I employ the principle that a ray of polarized light when projected through a refracting substance in a magnetic field will have its plane of polarization rotated by the magnetic field. The embodiment of my invention herein disclosed for employing this principle comprises as elements thereof a source of polarized light, a plurality of magnetic fields and a photo-electric cell, all in the path of light rays from the source and appropriate electrical circuits, and an important feature of my invention is the character of the magnetic fields and also the manner of their production.

For the attainment of these objects and of such other objects as may hereinafter appear or be pointed out, I have illustrated an embodiment of my invention in the drawings wherein:—

Figures 3 and 4 are corresponding views of the horizontal and vertical scanning screens; and Figure 5 is a view more in detail showing the screen of Figure 4.

Figure 1:
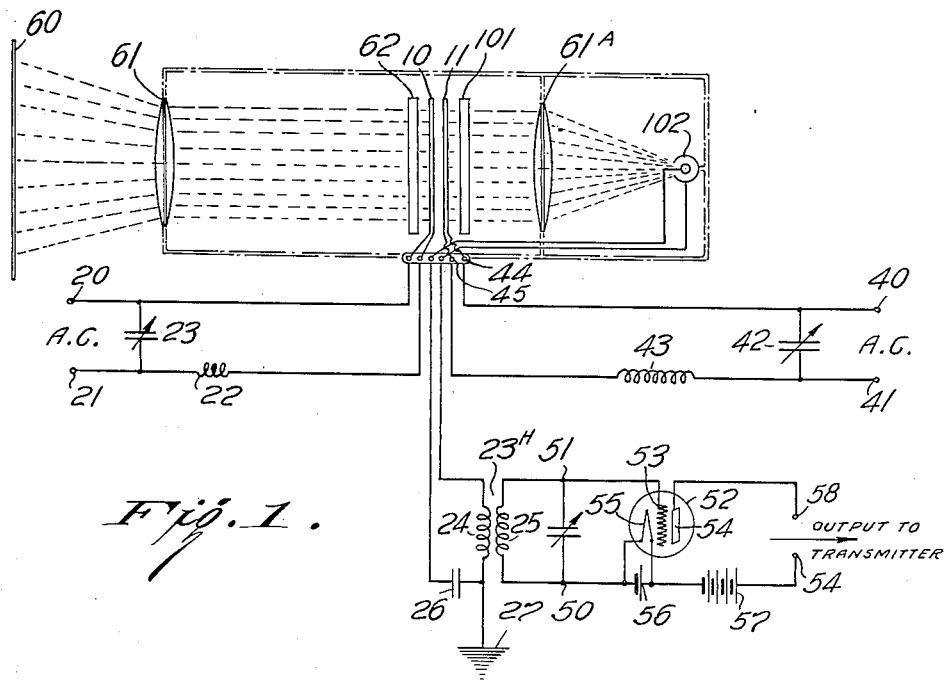
Figure 1 is a diagrammatic showing of transmitting apparatus and circuits embodying my invention.

In Figure 1 of the drawings I show schematically an object 60 in the path of light from a source (not shown) and a lens 61 to direct the light in the form of parallel rays to a polarizing crystal 62 this constituting a source of polarized light. The polarized light is then passed through the polarizing screens 10 and 11, which, with the circuits of which they form parts, are of such a character as to form a plurality of magnetic fields in the path of polarized rays, all as will be more fully hereinafter set forth. The polarized rays, after they pass through the magnetic fields, are then directed through an analyzing crystal 101, then through a condensing lens 61A and on to a photo-electric cell 102 to modulate the carrier waves to the transmitting circuit.

As the polarizing screens 10 and 11 form very important features of my invention, I will now proceed to describe them. In Figure 3 I show what I will hereinafter refer to as the vertical polarizing screen and its circuit, and in Figure 4 the horizontal polarizing screen and its circuit. In Figures 3 and 4 these screens are shown graphically only, and in Figure 5 is shown more in detail one form which the polarizing screens may take, the detailed showing being made in connection with the horizontal polarizing screen of Figure 4.

The screens 10 and 11 are each in effect a conductor looped back and forth so as not only to be spread over a predetermined area but also to cover a great portion of said area. The graphic showing of Figures 3 and 4 is merely of a few loops. In the actual embodiment, it will probably be advisable or even necessary to have the adjacent loops closer together than shown in these figures. In the embodiment herein disclosed, I form the conductor by deposition on a base such as glass. An etching or photo-engraving process may be employed to give the metallic deposit the necessary conformation to serve as an electric conductor.

The screen 10 (see Fig. 3) is in a circuit having its terminals 20 and 21 connected to a source of alternating current and the circuit includes an inductance 22 and a condenser 23.

The polarizing screen 11 (see Fig. 4) may be similar to that of Figure 3, except that the conductor sections are arranged generally horizontally, that is, substantially at right angles to the conductor sections of the screen 10. The reason for this is that when the two screens 10 and 11 are brought into juxtaposition as in Figure 1, and into the relative positions of Figures 3 and 4, the points where the two sets of conductors cross, form what in effect are scanning points as will be more fully pointed out later.

The polarizing screen 11 is in the circuit shown in Figure 4. This circuit has its terminals connected to input oscillator terminals 40 and 41 and is provided in the circuit with a condenser 42 and an inductance 43, wired to the output terminals 44 and 45 which are electrically connected with the polarized screen.

The screen 11 as illustrated in greater detail in Figure 5 comprises loops (A) which form inductance units and the leads (B) which represent the capacitances in parallel. It will be understood, of course, that while in Figure 5 I show the leads (B) represented as condensers, the capacity effect is attained in actual practice between the terminals of each coil. The inductance units are disposed with relation to the screen as a whole, so as to maintain the axes of the inductance units at right angles to the plane of the screen. The alternate inductances are of opposite direction as to winding.

It will be understood, of course, that the screens of Figures 3 and 4 will partake of the characteristics given this screen in Figure 5. This design introduces an impedance in every unit of the screen, which builds up progressively from unit to unit and this coupled with the effect of the phase relation of the currents in the two crossed screens gives the "lag" which I find necessary in my system to produce the desired effects, all as will be more fully explained.

If two inductances adjacent to each other carry alternating currents of different frequencies the magnetic field created by each will affect the other. The total magnetic field will be increased or decreased dependent upon the phase relation of the two currents. When they are in phase the magnetic field will be doubled; when out of phase the magnetic fields will neutralize each other, if the individual currents and inductances have magnetic effects of equal value.

We therefore put two sets of a plurality of inductances adjacent to one another, with axes coinciding, and by using a predetermined ratio of two different frequencies, create a combination wherein the two currents are in phase in but one set of opposed inductance units at a given moment, being out of phase with all other units at that moment, introducing an impedance effect, as well as a neutralization of the magnetic fields during the negative cycle and adding to the impedance self created in the other units.

Now, if the time for one cycle of the higher of the two frequencies be timed to coincide with the time of the lag of the current between the units of the screen carrying the lower frequency, then the current of higher frequency will be in phase with the current of lower frequency once during each cycle of the current of higher frequency, and, as to position of phase, in one after another of the units of the screen carrying the lower frequency. Thus the resultant magnetic field will be added to at the time of being in phase, creating in one unit at a time and in a sequence following the travel of the lower frequency, a magnetic field of twice the value of that in any other unit at a given moment.

This will give us a magnetic scanning of the entire area of the screen, and by the rotary polarization effect will allow the light rays projected upon the screen to pass through the units, one at a time and in succession, thus covering the entire area of the screen.

These rays coming through the screen through one magnetic unit at a time are projected upon a photo-electric cell 102 to control its action and the current from the photo-cell, as modulated by the varying values of the various light rays, can be transmitted by usual and well-known means. The circuit from the photo-electric cell 102 (see Fig. 1) comprises a transformer 23H, having a primary winding 24, one end of which is connected to one side of the photo-electric cell 102 and the other terminal of the photo-electric cell is connected to one side of a condenser 26. The other side of the condenser 26 is connected to the remaining terminal of the primary winding 24, then to a ground connection 27. The secondary winding 25 is connected to condenser terminals 50—51. Connection is then made from these terminals to a thermionic vacuum tube 52 having a grid element 53, a plate element 54 and a filament 55. The filament is heated by a current supply source 56 and the plate 54 is energized by a high voltage battery or generator 57 when the circuit is completed between the terminals 58 and 59.

Figure 2:
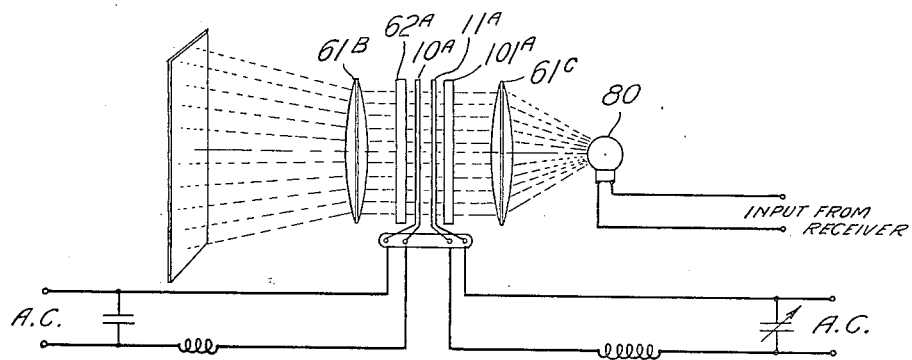
Figure 2 is a view similar to Figure 1 of the receiving end of my apparatus and circuits.

In Figure 2 of the drawings, I show schematically, the receiving end of my apparatus. 80 is a neon glow tube in the input circuit from the receiver. 61c is a lens for projecting rays from the neon tube in parallel lines through the instrument through the polarizing crystal 101a, through the magnetic fields formed by the polarizing screens 10a and 11a, through the analyzing crystal 62a, through the projecting lens 61b, and onto the screen. No detailed description of these parts or of their operation has been here given because, both in construction and functioning, they duplicate the corresponding parts of Figure 1. The circuits to the screens 10a and 11a are, as shown, substantial duplicates of the corresponding circuits in the transmitting end, and as shown in Figure 1.

Having thus described my invention and illustrated its use, what I claim as new and desire to secure by Letters Patent is—

1. In a system of scanning light rays emanating from a source or object in which the total, simultaneous emanations are divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed transversely of the ray emanations and associated with a by-refringent medium for the passage of the ray emanations thereby and through the interstices between adjacent portions of the conductors, and means for causing the passage of constant frequency, pulsating currents through the conductors.

2. In a system of scanning light rays emanating from a source or object in which the total, simultaneous emanations are divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed transversely of the ray emanations and positioned adjacent to a transparent medium adapted to become birefringent when subjected to magnetic stresses, whereby the ray emanations will pass through the interstices between adjacent portions of the conductors and through said medium, and means for causing the passage of constant frequency, pulsating currents through the conductors.

3. In a system of scanning light rays emanating from a source or object in which the total, simultaneous emanations are divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed along parallel lines transversely of the ray emanations and positioned adjacent to a transparent medium adapted to become birefringent when subjected to magnetic stresses, whereby the ray emanations will pass through the interstices between adjacent portions of the conductors and through said medium, and means for causing the passage of constant frequency, pulsating currents through the conductors.

4. In a system of scanning light ray emanations from a source or object in which the total, simultaneous emanations are divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed along parallel lines transversely of the ray emanations and positioned on glass whereby the ray emanations will pass through the interstices between adjacent portions of the conductors and through said medium, and means for causing the passage of constant frequency, pulsating currents through the conductors.

5. In a system of scanning light rays emanating from a source or object in which the total, simultaneous emanations are divided into portions of small extent, so that each portion is effective individually and in a predetermined sequence in accordance with its location transversely of the direction of the rays, apparatus for breaking up the simultaneous ray emanations into the consecutively active, individually effective portions, which includes a system comprising a plurality of serially connected electrical conductors disposed along parallel lines transversely of the ray emanations and positioned adjacent to a transparent medium adapted to become birefringent when subjected to magnetic stresses, whereby the ray emanations will pass through the interstices between adjacent portions of the conductors and through said medium, a second system comprising a plurality of serially connected electrical conductors disposed along parallel lines transversely of the ray emanations and positioned adjacent to a transparent medium adapted to become birefringent when subjected to magnetic stresses, said parallel lines of the second system, however, being disposed at an angle to the lines of said first system, means for causing the passage of constant frequency, pulsating currents through said first system of conductors, and means for causing the passage of constant frequency pulsating currents through said second system of conductors, said respective frequencies being different.

6. In the art of television, a receiving system for forming an image from electrical impulses received from a sending station, each of said impulses corresponding to a point of an object at the sending station of which the image is to be transmitted, and having a magnitude dependent on the brightness of that point, said apparatus comprising means for translating each of said electrical impulses into a field of light rays having an intensity proportional to the brightness of the point of the object to which it corresponds, means for breaking up said field of light rays into small portions, and transmitting to an image screen only that portion of the field that corresponds in position to the point of the image of which the impulse has been received, and in a similar way transmitting small portions of the field to said image screen, each corresponding only to a particular point of the image, said last named means comprising a plurality of serially connected electrical conductors disposed transversely of said field of rays and said conductors being positioned adjacent to a transparent medium adapted to become birefringent when subjected to magnetic stresses, whereby each emanation will pass through the interstices between adjacent points of said conductors and through said medium, and means for causing the passage of constant frequency pulsating currents through the conductors.

7. Apparatus as defined in claim 6, in which the conductors are disposed along lines parallel to each other.

8. In combination with apparatus as defined in claim 6, a second set of serially connected parallel conductors similar to the first, also disposed transversely to said field of rays and disposed along lines parallel to each other and at an angle to the conductors of the first set, and means for causing the passage of constant frequency pulsating current having a frequency different from that passing into the first set of conductors.

9. In the art of television, the combination of a transmitting system and a receiving system, said transmitting system being of a type in which the total, simultaneous light ray emanations from a source or object divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed transversely of the ray emanations and associated with a birefringent medium for the passage of the ray emanations thereby and through the interstices between adjacent portions of the conductors, and means for causing the passage of constant frequency, pulsating currents through the conductors, and said receiving system being of the type defined in claim 6.

10. In the art of television, the combination of a transmitting system and a receiving system, said transmitting system being of a type in which the total, simultaneous light ray emanations from a source or object are divided into portions of small extent, so that each portion is effective individually and in a predetermined sequence in accordance with its location transversely of the direction of the rays, apparatus for breaking up the simultaneous ray emanations into the consecutively active, individually effective portions, which includes a plurality of electrical conductors disposed transversely of the ray emanations and positioned adjacent to a transparent medium to become birefringent when subjected to magnetic stresses, whereby said ray emanations will pass through the interstices between adjacent portions of the conductors and through said medium, and means for causing the passage of constant frequency pulsating currents through the conductors, and said receiving system being of the type defined in claim 7, and with the conductors thereof disposed along lines parallel to each other.

11. In the art of television, the process of scanning a picture or object which comprises the steps of plane polarizing the field of light rays proceeding from said picture or object, twisting the plane of polarization of fractional portions of said field of polarized light rays without destroying their characteristic of plane polarization, and causing said twisting of the plane of polarization of said fractional portions to take place in a predetermined sequence so as to cover the whole field of rays, obstructing the passage of all fractional portions of said field of rays except those having their plane twisted through a predetermined angle, and converting said transmitted fractions into electrical impulses suitable for transmission to a receiving station.

12. In the art of television, the process of scanning a picture or object which comprises the steps of plane polarizing the field of light rays proceeding from said picture or object, twisting the plane of polarization of fractional portions of said field of polarized light rays without destroying their characteristic of plane polarization and causing said twisting of the plane of polarization of said fractional portions to take place at points lying in a single plane substantially perpendicular to the path of the rays, in a predetermined sequence progressively along parallel lines so as to cover the whole field of rays, obstructing the passage of all fractional portions of said field of rays except those having their plane twisted through a predetermined angle, and converting said transmitted fractions into electrical impulses suitable for transmission to a receiving station.

13. In the art of television, the process of scanning a picture or object which comprises the steps of plane polarizing the field of light rays proceeding from said picture or object, twisting the plane of polarization of fractional portions of said field of polarized light rays without destroying their characteristic of plane polarization, and causing said twisting of the plane of polarization of said fractional portions to take place at points lying in a single plane substantially perpendicular to the path of the rays in a predetermined sequence progressively along parallel lines so as to cover the whole field of rays, causing a second twisting of fractional portions of said field of polarized light rays at points lying in a second plane parallel to said first plane, said second twisting taking place progressively along parallel lines positioned at an angle to said first mentioned parallel lines, and at a rate of speed that is different from that of said first mentioned twisting step, obstructing the passage of all fractional portions of said field of rays except those having their plane twisted through a predetermined angle, and converting said transmitted fractions into electrical impulses suitable for transmission to a receiving station.

14. In the art of television, the process of scanning a picture or object which comprises the steps of plane polarizing the field of light rays proceeding from said picture or object, twisting the plane of polarization of fractional portions of said field of polarized light rays without destroying their characteristic of plane polarization, and causing said twisting of the plane of polarization of said fractional portions to take place at points lying in a single plane substantially perpendicular to the path of the rays in a predetermined sequence progressively along parallel lines so as to cover the whole field of rays, causing a second twisting of fractional portions of said field of polarized light rays at points lying in a second plane parallel to said first plane, said second twisting taking place progressively along parallel lines positioned at a right angle to said first mentioned parallel lines, and at a rate of speed that is different from that of said first mentioned twisting step, obstructing the passage of all fractional portions of said field of rays except those having their plane twisted through a predetermined angle, and converting said transmitted fractions into electrical impulses suitable for transmission to a receiving station.

15. In the art of television, the process of scanning a picture or object which comprises the steps of plane polarizing the field of light rays proceeding from said picture or object, causing a periodic twisting of the plane of polarization of fractional portions of said field of polarized light rays out of and back to their normal plane without destroying their characteristic of plane polarization, and causing said twisting of the plane of polarization of said fractional portions to take place in a predetermined sequence so as to cover the whole field of rays, obstructing the passage of all fractional portions of said field of rays except those having their plane twisted through a predetermined angle, and converting said transmitted fractions into electrical impulses suitable for transmission to a receiving station.

16. In the art of television, the process of scanning a picture or object, which comprises the steps of plane polarizing the field of light rays proceeding from said picture or object, causing a periodic twisting of the plane of polarization of fractional portions of said field of polarized light rays out of and back to their normal plane without destroying their characteristic of plane polarization, and causing said twisting of the plane of polarization of said fractional portions to take place at points lying in a single plane substantially perpendicular to the path of the rays in a predetermined sequence progressively along parallel lines so as to cover the whole field of rays, obstructing the passage of all fractional portions of said field of rays except those having their plane twisted through a predetermined angle, and converting said transmitted fractions into electrical impulses suitable for transmission to a receiving station.

17. In the art of television, the process of scanning a picture or object which comprises the steps of plane polarizing the field of light rays proceeding from said picture or object, causing a periodic twisting of the plane of polarization of fractional portions of said field of polarized light rays out of and back into their normal plane without destroying their characteristic of plane polarization, and causing said twisting of the plane of polarization of said fractional portions to take place at points lying in a single plane substantially perpendicular to the path of the rays in a predetermined sequence progressively along parallel lines, so as to cover the whole field of rays, causing a second periodic twisting out of and back into their normal plane of fractional portions of said field of polarized light rays at points lying in a second plane parallel to said first plane, said second periodic twisting taking place progressively along parallel lines positioned at an angle to said first mentioned parallel lines, and at a rate of speed that is different from that of said first mentioned twisting step, obstructing the passage of all fractional portions of said field of rays except those having their plane twisted through a predetermined angle, and converting said transmitted fractions into electrical impulses suitable for transmission to a receiving station.

18. In the art of television, the process of scanning a picture or object which comprises the steps of plane polarizing the field of light rays proceeding from said picture or object, causing a periodic twisting of the plane of polarization of fractional portions of said field of polarized light rays out of and back into their normal plane without destroying their characteristic of plane polarization of said fractional portions to take place at points lying in a single plane substantially perpendicular to the path of the rays in a predetermined sequence progressively along parallel lines so as to cover the whole field of rays, causing a second periodic twisting out of and back into their normal plane of fractional portions of said field of polarized light rays at points lying in a second plane parallel to said first plane, said second periodic twisting taking place progressively along parallel lines positioned at a right angle to said first mentioned parallel lines, and at a rate of speed that is different from that of said first mentioned twisting step, obstructing the passage of all fractional portions of said field of rays except those having their plane twisted through a predetermined angle, and converting said transmitted fractions into electrical impulses suitable for transmission to a receiving station.

19. In the process of forming an image of an object positioned at a transmitting station, by means of electrical impulses each corresponding in intensity to the brightness of a particular point of said object received from said transmitting station, said process comprising the steps of converting each of said electrical impulses into a field of light rays corresponding in intensity to the brightness of the point of the object to which the electrical impulse corresponds, locating a small portion only of said field of light rays at a point on an image screen corresponding positionally to the particular point of the object to which the electrical impulse corresponds, said locating step being accomplished by plane polarizing said field of light rays, and periodically twisting the plane of polarization of fractional portions of said field of rays out of and back into their normal plane of polarization, without however destroying their characteristic of plane polarization, and causing said twisting of the plane of polarization of said fractional portions to take place in a predetermined sequence so as to cover the whole field of rays, and thereafter obstructing the passage of all fractional portions of said field of rays except those having their plane twisted through a predetermined angle, and receiving said transmitted fractions on an image screen.

20. In the process of forming an image of an object positioned at a transmitting station, by means of electrical impulses each corresponding in intensity to the brightness of a particular point of said object received from said sending station, said process comprising the steps of converting each of said electrical impulses into a field of light rays corresponding in intensity to the brightness of the point of the object to which the electrical impulse corresponds, locating a small portion only of said field of light rays at a point on an image screen corresponding positionally to the particular point of the object to which the electrical impulse corresponds, said locating step being accomplished by plane polarizing said field of light rays, and periodically twisting the plane of rays out of and back into their normal plane of polarization, without however destroying their characteristic of plane polarization, and causing said twisting of the plane of polarization of said fractional portions to take place in a predetermined sequence so as to cover the whole field of rays, submitting said field of rays to a second similar twisting, the sequence of twisting being effected at a different rate of speed from said first twisting, and thereafter obstructing the passage of all fractional portions of said field of rays except those having their plane twisted through a predetermined angle, and receiving said transmitted fractions on an image screen.

CHARLES A. BIRCH-FIELD.